United States Patent [19]

Kahlke

[11] Patent Number: 5,402,767
[45] Date of Patent: Apr. 4, 1995

[54] COOKING APPLIANCE HAVING A PLATE MADE OF A MATERIAL TRANSPARENT TO THERMAL RADIATION AND HAVING AT LEAST TWO TYPES OF HEAT SOURCES

[75] Inventor: Michael Kahlke, Mainz-Kastel, Germany

[73] Assignee: Schott Glaswerke, Mainz, Germany

[21] Appl. No.: 110,240

[22] Filed: Aug. 23, 1993

[30] Foreign Application Priority Data

Aug. 21, 1992 [DE] Germany ............... 42 27 672.1

[51] Int. Cl.⁶ .................................................. F24C 3/00
[52] U.S. Cl. ............................... 126/39 D; 126/39 J; 126/39 K
[58] Field of Search .................. 126/39 J, 39 D, 39 R

[56] References Cited

U.S. PATENT DOCUMENTS 1,764,718  6/1930  Gercich et al. .
4,846,144  7/1989  Krohn et al. ................... 126/39 R
4,899,723  2/1990  Pajares ............................ 126/39 R
5,139,007  8/1992  Martinez .......................... 126/39 J

FOREIGN PATENT DOCUMENTS 2626964  8/1989  France .
3049491  9/1984  Germany .
3715126  4/1991  Germany .

*Primary Examiner*—Carroll B. Dority
*Attorney, Agent, or Firm*—Millen, White, Zelano & Branigan

[57] ABSTRACT

A cooking appliance having a plate of a material transparent to thermal radiation, such as glass-ceramic, having adjustable heat sources distributed under, in, or on the plate, which are heated by direct or indirect heat transfer, electrically, and/or by gas and/or other heating means, the plate possessing at least two types of heat sources which use different kinds of heat transfer, these all being heated by means of gas.

19 Claims, 1 Drawing Sheet

COOKING APPLIANCE HAVING A PLATE MADE OF A MATERIAL TRANSPARENT TO THERMAL RADIATION AND HAVING AT LEAST TWO TYPES OF HEAT SOURCES

BACKGROUND OF THE INVENTION

The invention relates to a cooking appliance having a plate made of a material transparent to thermal radiation, such as glass-ceramic, glass, ceramic, or a similar material, for cooking, baking, frying, and/or keeping warm, having adjustable heat sources distributed under, in, or on the plate, heated by means of direct or indirect heat transfer, electrically, and/or by gas and/or by other heating means, in which the plate possesses at least two types of heat sources which use different kinds of heat transfer.

At present, various hob-type or stovetop systems (hereinafter "hobs") are known commercially:

(1) Hobs having atmospheric open burners whose covering can comprise metal, e.g., steel, or steel-enamel or glass. The advantages of these appliances are in their ability to operate with a very short response time and fine adjustability of the heat output. The immediate visual recognition of a flame can also be advantageous for avoiding burn injuries when using this type of hob. A further compelling reason for the acquisition of such cooking appliances is also the very favorable price.

There are nevertheless disadvantages in the areas of appearance, diversity of design, and also, in particular, in ease of use and cleaning. Neither will a hob of this construction ever provide, as a work surface, an additional usable space, e.g., for the preparation of meals or for the safe setting down of, e.g., foodstuffs, pots, or pans.

(2) Hobs having a level covering over the entire surface, in particular of glass-ceramic, whose heat sources are arranged under the plate and which, according to the current state of the art, can be heated electrically by heating coils or by infrared radiant gas burners. Advantages associated with these hobs are their attractive appearance and their diversity of design, which can be ideally matched to a large variety of decor and color schemes in any particular kitchen layout. Cleaning of the level plate is also easy and problem-free, and the plate can also be used as an additional work surface or place for safely setting down, e.g., pans. The temperature distribution at low temperatures, as are required, for example, for keeping food warm, is appreciably more uniform in this kind of cooking area which is not heated directly by a flame, and the peak temperatures occurring are very much lower. Disadvantages which should be mentioned here are a delayed emission of heat to the food to be heated and a correspondingly lower energy efficiency of the heating means, and hence also a longer heat-up time for the food. In addition, the price of these hobs is considerably higher in comparison with the metal hob with open burners.

(3) A further variant is an electric cooker with a metal covering which, in contrast to the above-mentioned covering over the entire surface has individual discrete raised cooking areas, mostly of black cast iron. Its disadvantages are, inter alia, the appearance and, again, the poor ease of cleaning. Also, even up to very high temperatures, visual recognition whether a cooking area is presently being heated is impossible. Its advantage is its relatively low price.

DE 30 49 491 C2, claims a cooker whose top surface is formed of a single, level heat-transfer plate with a continuous closed surface, in particular, a glass-ceramic plate, under which is arranged at least one radiant gas burner, and at least one electric radiant element is arranged under the heat-transfer plate outside the gas cooking region, beside, and/or in the simmering warm-plate region.

DE 30 49 491 C2, thus, discloses radiant gas burners, in addition to electrically supplied radiant elements under a heat-transfer plate having a continuous closed surface.

FR 2 626 946 A1 discloses a cooker in which there is an electric radiant element under a glass-ceramic covering and, in addition, normal gas burners with open flame are provided.

FR 2 626 964 A1, thus, discloses different types of heat sources, namely, electric radiant elements next to normal gas burners, the glass-ceramic plates here in each case covering only the single electric radiant element and do not form a continuous plate with heat sources distributed under, in, or on it.

DE 37 15 126 C2 discloses a cooking area especially for a burner in a mobile home, with a cooking area frame and an intermediate bottom design, whose object is to avoid disturbing deformations of the intermediate bottom and, at the same time, to achieve good heat insulation of the cooking area.

U.S. Pat. No. 1,764,718 describes a device for improved air supply in overlapped gas burners.

None of these documents discloses a cooking device which exhibits at least two types of heat sources using different kinds of heat transfer, in which the heat sources are all heated by gas.

SUMMARY OF THE INVENTION

An object of the invention is to provide a cooking appliance with a plate transparent to thermal radiation, which combines the advantages of the concepts known from the prior art and which offers the ideal heat source for the particular cooking situation. A further object of the invention is to provide the consumer with a plate which, in diversity of design, range of decor, individual matching to the room surroundings, and ease of cleaning, corresponds to what is technically possible and feasible today.

At the same time, optimum safety, such as the immediate recognition of the operational status of the heat source, a short heat-up period for the food, and quick response to adjustments, i.e., a high use efficiency for the energy introduced, are to be achieved.

Upon further study of the specification and appended claims, further objects and advantages of this invention will become apparent to those skilled in the art.

To attain these objects according to the invention, all types of heat sources are heated by means of gas.

In a preferred embodiment, heat sources of one type are arranged under the plate and work indirectly by infrared radiation through the plate, whereas heat sources of another type are arranged over or at the level of the plate and transfer heat directly by production of open flames.

The heat sources of one type are in the form of infrared radiant gas burners, whereas the heat sources of another type are open gas burners, i.e., the plate simultaneously has infrared radiant gas burners and atmospheric open gas burners.

To carry out this invention, it is necessary for the plate to be provided with ports for heat sources arranged in and/or over the plate.

Should other heat sources be used, such as, for example, so-called "heat pipes", then recesses need to be provided for the heat sources arranged in the plate.

DETAILED DESCRIPTION

Figure 1:
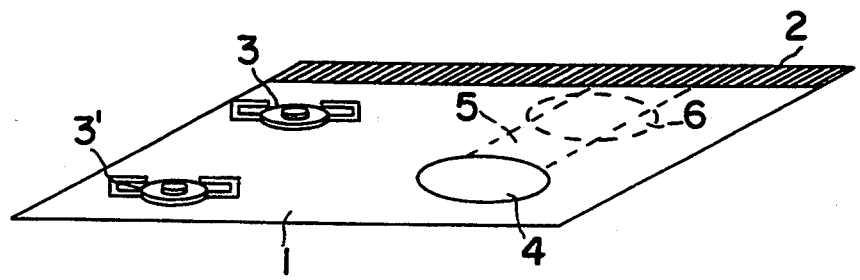
FIG. 1 shows the plate of a gas cooking appliance with two open gas burners and one infrared radiant gas burner with a warm-plate zone.

FIG. 1 shows a glass-ceramic plate (1) of a gas cooking appliance and a perforated strip (2) for the waste gas outflow.

Four heat sources are distributed on the plate, the heat sources (3) and (3') being designed as open gas burners and the heat source (4) being designed as an infrared radiant gas burner.

The radiant gas burners, which require a flue duct (5), are so arranged in this illustrative embodiment that the flue duct (5) has the greatest possible heat-exchange surface with the glass-ceramic plate lying above it; and, as a result, a warm-plate zone (6) is provided as an additional heat source.

The temperature of the warm-plate zone can be regulated by targeted control, for example, of the path length of the waste gas stream under the glass-ceramic plate.

This plate of a gas cooking appliance combines the advantages of open flame, such as short heat-up period for the food, quick adjustability, and immediate visual recognition of the flame with the conveniences of a glass-ceramic plate, such as diversity of design, decorability, individual matching to the room surroundings, and ease of cleaning.

Furthermore, the simmering temperatures can be set better with infrared radiant gas burners than with open gas burners. Warm-plate zones can likewise be achieved here.

With this type of appliance, the customer can individually decide which heat source she/he wants to use, optimally, for each procedure.

Figure 2:
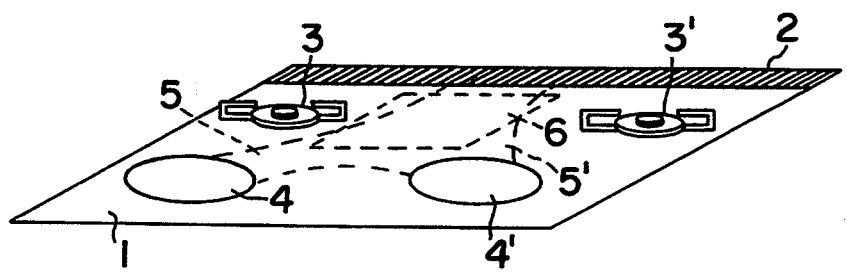
FIG. 2 shows the plate of a gas cooking appliance with two open gas burners and two infrared radiant gas burners with a warm-plate zone.

FIG. 2 shows a plate (1) with five heat sources, two open gas burners (3, 3'), two radiant gas burners (4, 4'), and a warm-plate zone (6), which is arranged over the flue ducts (5, 5') of the infrared radiant gas burners, the warm-plate zone (6) being between the open gas burners (3, 3').

Figure 3:
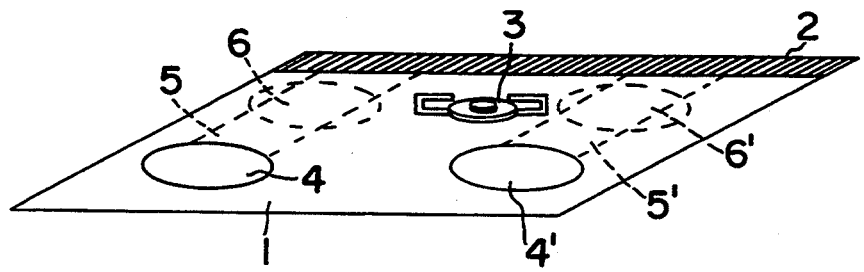
FIG. 3 shows the plate of a gas cooking appliance with one open gas burners and two infrared radiant gas burners with two warm-plate zones.

FIG. 3 likewise shows a plate (1) with five heat sources, i.e., one open gas burner (3), two radiant gas burners (4, 4'), and two warm-plate zones (6, 6').

Figure 4:
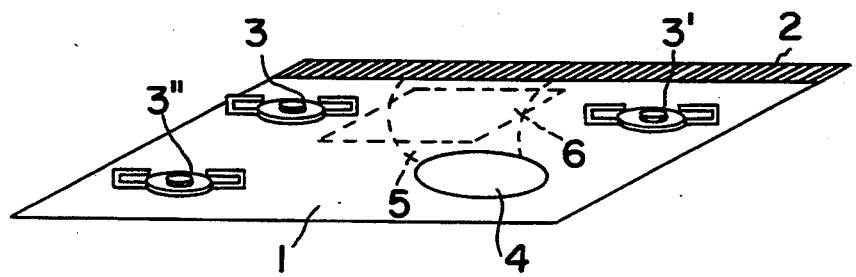
FIG. 4 shows the plate of a gas cooking appliance with three open gas burners and one infrared radiant gas burner with a warm-plate zone.

FIG. 4 shows a plate (1) with five heat sources. In addition to three open gas burners (3, 3', 3''), one infrared radiant gas burner (4), and one warm-plate zone (6) are provided.

The entire disclosures of all applications, patents, and publications, cited herein, and of corresponding German Application P 42 27 672.1, filed Aug. 21, 1992, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

I claim:

1. A cooking appliance comprising a horizontal plate of a material transparent to thermal radiation and at least two adjustable gas burner means, at least one of said gas burner means being located above said plate to act as a direct heat transfer source and at least one other different type gas burner means being located under said plate to act as an indirect heat transfer source.

2. A cooking appliance according to claim 1, wherein said indirect heat transfer source under said plate is an infrared radiant gas burner capable of transferring infrared radiation through the plate.

3. A cooking appliance according to claim 1, wherein said direct heat transfer source is an atmospheric open gas burner capable of producing open flames and direct heat transfer.

4. A cooking appliance according to claim 1, wherein said direct heat transfer source is an atmospheric open gas burner capable of producing open flames and direct heat transfer.

5. A cooking appliance according to claim 2, further comprising a flue duct underneath said plate, said flue duct having an indirect heat exchange surface for providing a warm-plate zone on said plate.

6. A cooking appliance according to claim 3, further comprising a flue duct underneath said plate, said flue duct having an indirect heat exchange surface for providing a warm-plate zone on said plate.

7. A cooking appliance according to claim 4, further comprising a flue duct underneath said plate, said flue duct having an indirect heat exchange surface for providing a warm-plate zone on said plate.

8. A cooking appliance according to claim 1, wherein said appliance comprises two direct heat transfer sources and two indirect heat sources.

9. A cooking appliance according to claim 2, further comprising two flue ducts under said plate, said flue ducts each having an indirect heat-exchange surface which provides a warm-plate zone on said plate.

10. A cooking appliance according to claim 1, wherein said plate is a glass ceramic.

11. A cooking appliance according to claim 2, wherein said plate is a glass ceramic.

12. A cooking appliance according to claim 3, wherein said plate is a glass ceramic.

13. A cooking appliance according to claim 4, wherein said plate is a glass ceramic.

14. A cooking appliance according to claim 7, wherein said plate is a glass ceramic.

15. A cooking appliance according to claim 4, further comprising two flue ducts under said plate, said flue ducts each having an indirect heat-exchange surface which provides a warm-plate zone on said plate.

16. A cooking appliance according to claim 7, wherein said appliance contains two atmospheric open gas burners as direct heat transfer sources and one infrared radiant gas burner as an indirect heat transfer source, and wherein waste gas is discharged from said infrared radiant gas burner via said flue duct.

17. A cooking appliance according to claim 7, wherein said appliance contains two atmospheric open gas burners as direct heat transfer sources and two infrared radiant gas burners as indirect heat transfer sources, and wherein waste gas is discharged from said infrared radiant gas burners via said flue duct.

18. A cooking appliance according to claim 15, wherein said appliance contains one atmospheric open gas burner as a direct heat transfer source and two infrared radiant gas burners as indirect heat transfer sources, wherein each infrared radiant gas burner is in fluid communication with one of said two flue ducts whereby waste gas is removed from said infrared radiant burners.

19. A cooking appliance according to claim 7, wherein said appliance contains three atmospheric open gas burners as direct heat transfer sources and one infrared radiant gas burner as an indirect heat transfer source, and wherein waste gas is discharged from said infrared radiant gas burner via said flue duct.

* * * * *